(12) United States Patent
Jana et al.

(10) Patent No.: US 12,112,162 B2
(45) Date of Patent: Oct. 8, 2024

(54) METHOD AND SYSTEM FOR MAPPING INTERMEDIATE REPRESENTATION OBJECTS FOR FACILITATING INCREMENTAL ANALYSIS

(71) Applicant: Tata Consultancy Services Limited, Mumbai (IN)

(72) Inventors: Anushri Jana, Pune (IN); Ankita Shamrao Khadsare, Pune (IN); Vaidehi Manoj Ghime, Pune (IN); Bharti Chimdyalwar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 127 days.

(21) Appl. No.: 18/146,702

(22) Filed: Dec. 27, 2022

(65) Prior Publication Data

US 2023/0266967 A1    Aug. 24, 2023

(30) Foreign Application Priority Data

Feb. 24, 2022   (IN) .............................. 202221010045

(51) Int. Cl.
*G06F 9/44*      (2018.01)
*G06F 8/75*      (2018.01)
(52) U.S. Cl.
CPC ....................................... *G06F 8/75* (2013.01)
(58) Field of Classification Search
None
See application file for complete search history.

(56) References Cited

U.S. PATENT DOCUMENTS

| | | | |
|---|---|---|---|
| 9,354,867 B2* | 5/2016 | Jain .......................... | G06F 8/70 |
| 10,409,574 B2 | 9/2019 | Sathyanathan et al. | |
| 10,409,966 B2 | 9/2019 | Gu et al. | |
| 11,023,212 B1 | 6/2021 | Kawahito | |
| 2010/0211932 A1* | 8/2010 | Jones ....................... | G06F 8/20 |
| | | | 717/124 |
| 2019/0361686 A1* | 11/2019 | Gnazdowsky ............ | G06F 8/65 |

(Continued)

FOREIGN PATENT DOCUMENTS

CN    109240698 B    11/2021

*Primary Examiner* — Insun Kang
(74) *Attorney, Agent, or Firm* — FINNEGAN, HENDERSON, FARABOW, GARRETT & DUNNER, LLP

(57) ABSTRACT

For performing incremental analysis, analysis tools may reuse analysis information computed earlier for intermediate representation (IR) objects that remain unchanged between versions of program. But identification numbers (IDs) of unchanged IR objects change over versions due to changes with each run of incremental analysis, thereby making it difficult to reuse analysis information as tools require IDs of unchanged IR objects from previous versions. Present disclosure provides method and system for mapping IR objects for facilitating incremental analysis. The system first extracts attributes associated with each IR object present in previous version to create data structure for storing IR objects. The system then determines unchanged lines between versions to create line number map. Thereafter, system uses line number map to create ID-based IR mapping between ID of each unchanged IR object present in each unchanged line in current version and ID of each IR object stored in data structure.

15 Claims, 5 Drawing Sheets

(56) References Cited

U.S. PATENT DOCUMENTS

| | | | |
|---|---|---|---|
| 2021/0365359 A1* | 11/2021 | Muske | G06F 11/327 |
| 2022/0206789 A1* | 6/2022 | Rosenbaum | G06F 8/73 |
| 2022/0261543 A1* | 8/2022 | Wackerly | G06F 8/33 |

* cited by examiner

```
┌─────────────────────────────────────────────────────────────┐
│  receiving, by an intermediate representation mapping       │
│  system (IRMS) via one or more hardware processors, a       │
│  current version and a previous version of a computer       │
│  program, and an intermediate representation (IR)           │
│  associated with each of the current version and the        │
│  previous version of the computer program, wherein the      │
│  IR associated with each of the current version and the     │
│  previous version comprises one or more IR objects   402    │
└─────────────────────────────────────────────────────────────┘
                              ▼
┌─────────────────────────────────────────────────────────────┐
│  extracting, by the IRMS via the one or more hardware       │
│  processors, one or more attributes associated with each    │
│  IR object of the one or more IR objects present in the     │
│  previous version of the computer program, the one or       │
│  more attributes comprising a line number, an object type,  │
│  an identification number (ID), and a name           404    │
└─────────────────────────────────────────────────────────────┘
                              ▼
┌─────────────────────────────────────────────────────────────┐
│  creating, by the IRMS via the one or more hardware         │
│  processors, a data structure for storing the one or more   │
│  IR objects present in the previous version of the          │
│  computer program, wherein each IR object is stored in      │
│  the data structure based on the one or more attributes     │
│  extracted for respective IR object                  406    │
└─────────────────────────────────────────────────────────────┘
                              ▼
┌─────────────────────────────────────────────────────────────┐
│  comparing, by the IRMS via the one or more hardware        │
│  processors, the current version and the previous version   │
│  of the computer program using a data comparison tool to    │
│  determine one or more lines that are unchanged between     │
│  the current version and the previous version of the        │
│  computer program                                    408    │
└─────────────────────────────────────────────────────────────┘
                              ▼
┌─────────────────────────────────────────────────────────────┐
│  creating, by the IRMS via the one or more hardware         │
│  processors, a line number map based on the one or more     │
│  unchanged lines, the line number map comprising a line     │
│  number based mapping between each unchanged line in        │
│  the current version and a respective unchanged line in     │
│  the previous version of the computer program        410    │
└─────────────────────────────────────────────────────────────┘
                              ▼
┌─────────────────────────────────────────────────────────────┐
│  creating, by the IRMS via the one or more hardware         │
│  processors, an ID-based IR mapping between the ID of       │
│  each unchanged IR object of one or more unchanged IR       │
│  objects present in each unchanged line in the current      │
│  version and the ID of each IR object stored in the data    │
│  structure using the created line number map         412    │
└─────────────────────────────────────────────────────────────┘

FIG. 4
                                                         400
```

| Line no | Chunked IR objects set | | | |
|---|---|---|---|---|
| ... | ... | | | |
| 6 | ID | Type | Name | isMapped |
| | 201 | Ident | a | False |
| | 202 | Binary | = | False |
| | 203 | Ident | a | False |
| | 204 | Binary | + | False |
| | 205 | Ident | b | False |
| ... | ... | | | |

FIG. 5

| Line No (V2) | Line No (V1) |
|---|---|
| ... | ... |
| 7 | 6 |
| ... | ... |

FIG. 6

| ID (current version) | ID (previous version) |
|---|---|
| 204 | 201 |
| 205 | 202 |
| 206 | 203 |
| 207 | 204 |
| 208 | 205 |

FIG. 7

```
Inputs:
prevIRs - IRs of the previous version of the program
currIRs - IRs of the current version of the program
currPgm - current version of the program
prevPgm - previous version of the program
Output:
IRMap - a map with key as ID of the current version IR object
with its value as ID of the mapped IR object from the previous version
lineMap ← createLineMap(currPgm, prevPgm)
prevIrInfoMap ← buildPrevVerIRInfo(prevIRs)
IRMap ← 0
irObjSet ← getIRObjs(currIRs)
for irObj ∈ irObjSet do
    mappedLine ← lineMap[getSrcLine(irObj)]
    if mappedLine ≠ 0 then
        mappedID ← findMappedID(prevIrInfoMap, mappedLine,
            getType(irObj), getName(irObj))
        if mappedID ≠ 0 then
            IRMap[getID(irObj)] ← mappedID
procedure BUILDPREVVERIRINFO(prevIRs)
    prevIRInfoMap ← 0
    irObjSet ← getIRObjs(prevIRs)
    for irObj ∈ irObjectSet do
        chunkedIrObj ← createIRObjChunk(irObj)
        prevIRInfoMap[getSrcLine(irObj)] ← prevIRInfoMap[getSrcLine(irObj)]
            ∪ chunkedIrObj
    return prevIRInfoMap
procedure FINDMAPPEDID(prevIRInfoMap, mappedLine, Type, Name)
    mappedID ← 0
    chunkedIrObjsAtALineSet ← prevIRInfoMap[mappedLine]
    for chunkedIrObj ∈ chunkedIrObjsAtALineSet do
        if ¬ isMapped(chunkedIrObj) then
            if isSame(getType(chunkedIrObj), Type) then
                if isSame(getName(chunkedIrObj), Name) then
                    setMappedFlag(chunkedIrObj)
                    mappedID ← getID(chunkedIrObj)
                    return mappedID
```

FIG. 8

METHOD AND SYSTEM FOR MAPPING INTERMEDIATE REPRESENTATION OBJECTS FOR FACILITATING INCREMENTAL ANALYSIS

PRIORITY CLAIM

This U.S. patent application claims priority under 35 U.S.C. § 119 to: Indian Patent Application No. 202221010045, filed on Feb. 24, 2022. The entire contents of the aforementioned application are incorporated herein by reference.

TECHNICAL FIELD

The disclosure herein generally relates to incremental analysis, and, more particularly, to a method and a system for mapping intermediate representation (IR) objects for facilitating incremental analysis.

BACKGROUND

An intermediate representation (IR) is a data structure generally used to represent a program. The IR represents each program entity as an object (also referred as IR object) and each object in the IR includes a unique identification number (ID). Basically, IRs are used by static program analysis tools for computing analysis information of programs at program points that are represented as IR objects in the IRs. The analysis information of each program point i.e., IR object is then stored against their corresponding ID.

Further, to perform incremental analysis, the incremental analysis tools may reuse the analysis information computed earlier for IR objects that remain unchanged between versions of the program. However, with each run of incremental static analysis, the IDs of the unchanged IR objects change over the versions, thereby creating an obstacle to reuse the analysis information as the tools may require IDs of the unchanged IR objects from previous versions for retrieving corresponding analysis information of the unchanged IR objects.

Additionally, even if the ID information associated with the IR objects from previous version is available, ensuring correctness of the analysis information retrieved for a particular unchanged IR object is a challenge as this requires an accurate mapping between the IDs of the unchanged IR object across the versions.

SUMMARY

Embodiments of the present disclosure present technological improvements as solutions to one or more of the above-mentioned technical problems recognized by the inventors in conventional systems. For example, in one aspect, there is provided a processor implemented method for mapping intermediate representation (IR) objects for facilitating incremental analysis. The method comprises receiving, by an intermediate representation mapping system (IRMS) via one or more hardware processors, a current version and a previous version of a computer program, and an intermediate representation (IR) associated with each of the current version and the previous version of the computer program, wherein the IR comprises one or more IR objects; extracting, by the IRMS via the one or more hardware processors, one or more attributes associated with each IR object of the one or more IR objects present in the previous version of the computer program, the one or more attributes comprising a line number, an object type, an identification number (ID), and a name; creating, by the IRMS via the one or more hardware processors, a data structure for storing the one or more IR objects present in the previous version of the computer program, wherein each IR object is stored in the data structure based on the one or more attributes extracted for a respective IR object; comparing, by the IRMS via the one or more hardware processors, the current version and the previous version of the computer program using a data comparison tool to determine one or more lines that are unchanged between the current version and the previous version of the computer program; creating, by the IRMS via the one or more hardware processors, a line number map based on the one or more unchanged lines, the line number map comprising a line number based mapping between each unchanged line in the current version and a respective unchanged line in the previous version of the computer program; and creating, by the IRMS via the one or more hardware processors, an ID-based IR mapping between the ID of each unchanged IR object of one or more unchanged IR objects present in each unchanged line in the current version and the ID of each IR object stored in the data structure using the created line number map.

In another aspect, there is provided an intermediate representation mapping system for mapping intermediate representation (IR) objects for facilitating incremental analysis. The system comprises a memory storing instructions; one or more communication interfaces; and one or more hardware processors coupled to the memory via the one or more communication interfaces, wherein the one or more hardware processors are configured by the instructions to: receive a current version and a previous version of a computer program, and an intermediate representation (IR) associated with each of the current version and the previous version of the computer program, wherein the IR comprises one or more IR objects; extract one or more attributes associated with each IR object of the one or more IR objects present in the previous version of the computer program, the one or more attributes comprising a line number, an object type, an identification number (ID), and a name; create a data structure for storing the one or more IR objects present in the previous version of the computer program, wherein each IR object is stored in the data structure based on the one or more attributes extracted for a respective IR object; compare the current version and the previous version of the computer program using a data comparison tool to determine one or more lines that are unchanged between the current version and the previous version of the computer program; create a line number map based on the one or more unchanged lines, the line number map comprising a line number based mapping between each unchanged line in the current version and a respective unchanged line in the previous version of the computer program; and create an ID-based IR mapping between the ID of each unchanged IR object of one or more unchanged IR objects present in each unchanged line in the current version and the ID of each IR object stored in the data structure using the created line number map.

In yet another aspect, there are provided one or more non-transitory machine-readable information storage mediums comprising one or more instructions which when executed by one or more hardware processors cause mapping of intermediate representation (IR) objects for facilitating incremental analysis by: receiving, by an intermediate representation mapping system (IRMS), a current version and a previous version of a computer program, and an intermediate representation (IR) associated with each of the current version and the previous version of the computer program, wherein the IR comprises one or more IR objects; extracting, by the IRMS, one or more attributes associated with each IR object of the one or more IR objects present in the previous version of the computer program, the one or more attributes comprising a line number, an object type, an identification number (ID), and a name; creating, by the IRMS, a data structure for storing the one or more IR objects present in the previous version of the computer program, wherein each IR object is stored in the data structure based on the one or more attributes extracted for a respective IR object; comparing, by the IRMS, the current version and the previous version of the computer program using a data comparison tool to determine one or more lines that are unchanged between the current version and the previous version of the computer program; creating, by the IRMS, a line number map based on the one or more unchanged lines, the line number map comprising a line number based mapping between each unchanged line in the current version and a respective unchanged line in the previous version of the computer program; and creating, by the IRMS, an ID-based IR mapping between the ID of each unchanged IR object of one or more unchanged IR objects present in each unchanged line in the current version and the ID of each IR object stored in the data structure using the created line number map.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 illustrates an exemplary flow diagram of a method for mapping IR objects for facilitating incremental analysis, in accordance with an embodiment of the present disclosure.

FIG. 5 illustrates an example representation of a data structure created for storing IR objects present in a previous version of a computer program, in accordance with an embodiment of the present disclosure.

FIG. 6 is an example representation of a line number map, in accordance with an embodiment of the present disclosure.

FIG. 7 is an example representation of an IR mapping created between IDs of the current version and the previous version of the computer program, in accordance with an embodiment of the present disclosure.

FIG. 8 is an algorithm for creating IR mapping, in accordance with an embodiment of the present disclosure.

DETAILED DESCRIPTION

Figure 1:
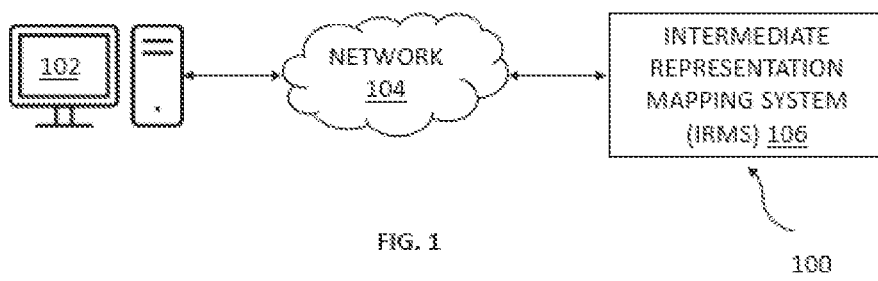
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Intermediate representation (IR) is a generic model that contains complete information of every program entity present in a source code including symbol table (ST), abstract syntax tree (AST), and associations between program entities. For performing analysis of the source code, the static program analysis tools may use IRs of the input program. When IRs are loaded in memory, every program entity in the source code can be seen as IR objects and each IR object is represented using a unique identification number. As discussed earlier, in static program analysis, analysis information is computed for every program point i.e., for every IR object. Thereafter, the computed analysis information is stored for every IR object using ID of the corresponding IR object.

In case of incremental program analysis, which reuses the analysis information for the unchanged IR objects from previous version of the program, the tools may require ID information of unchanged IR objects from the previous version as using the ID information, the analysis information of the unchanged IR objects can be retrieved and reused for the current version. However, with each run of static incremental analysis, the IDs that are assigned to the IR objects may not remain the same in both the versions, thus creating an obstacle to reuse the analysis information associated with the unchanged IR objects. The obstacle can be handled if a mapping (also referred as IR mapping) between IDs of the unchanged IR objects of consecutive versions is provided for incremental analysis.

In case of the incremental analysis, the IR mapping should be efficient enough and should not suppress the incremental speedup gained from the incremental analysis. Additionally, the correctness of the retrieved analysis information is important to ensure correctness of the incremental analysis. And correctness of the retrieved analysis information can be achieved through accurate IR mapping between versions.

In an IR mapping technique available in the art, authors leverage the edit distance calculation based on different criteria. Basically, the authors use an empirically calculated threshold to indicate a match between the IR entities. In the mapping technique, if the computed edit distance between two IR entities is below the empirically calculated threshold, the two IR entities are considered to be matching. Though the technique ensured some level of IR mapping between entities in consecutive versions, the correctness of the IR mapping was not guaranteed. So, the mapping technique that can ensure correctness of the IR mapping while ensuring efficiency is still to be explored.

Embodiments of the present disclosure overcome the above-mentioned disadvantages, such as efficient mapping system, accurate IR mapping between versions, etc., by providing a system and a method for mapping intermediate representation (IR) objects for facilitating incremental analysis. The system and the method of the present disclosure compute a mapping of IDs of unchanged IR objects between the consecutive versions of a program. For computing mapping, the system and the method first receive a current version and a previous version of a source code. The current version and the previous version are then utilized to find line numbers of the unchanged lines in the source code by finding difference between the consecutive versions i.e., the current version and the previous version. Thereafter, the system and the method match the IR objects present on an unchanged line number from the current version with the IR objects on its mapped line number of the previous version. It should be noted that relevant attributes, such as a line number, an object type, an identification number (ID), a name of the IR object and a mapping attribute is used by the system and the method to match corresponding IR objects. Further, the system and the method create an ID-based IR mapping of the matched IR objects between the current version and the previous version.

In the present disclosure, the system and the method use mapping attribute along with other attributes of the IR objects for matching every unchanged IR object present in two consecutive versions, thereby ensuring accuracy of the IR mappings while removing ambiguity. Further, the system and the method use only unchanged lines in the source code to perform the mapping, thereby ensuring high efficiency.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, creating data structure for storing IR objects, creating line number map, etc. The environment 100 generally includes an electronic device, such as an electronic device 102, and an intermediate representation mapping system (hereinafter referred as 'IRMS') 106, each coupled to, and in communication with (and/or with access to) a network 104. It should be noted that one electronic device is shown for the sake of explanation; there can be more number of electronic devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The electronic device 102 is associated with a user (e.g., a user or an entity such as an organization) who wants to perform incremental static analysis using the IRMS 106. Examples of the electronic device 102 include, but are not limited to, a personal computer (PC), a mobile phone, a tablet device, a Personal Digital Assistant (PDA), a server, a voice activated assistant, a smartphone and a laptop. In an embodiment, the electronic device 102 may include an incremental program analysis system (not shown in FIG. 1) that performs incremental program analysis of programs.

The intermediate representation mapping system (IRMS) 106 includes one or more hardware processors and a memory. The IRMS 106 is configured to perform one or more of the operations described herein. The IRMS 106 is configured to receive a current version and a previous version of a computer program, and an intermediate representation (IR) associated with each of the current version and the previous version of the computer program via the network 104 from the electronic device 106. The IR associated with each of the current version and the previous version includes one or more IR objects. The IRMS 106 is then configured to extract one or more attributes associated with each IR object of the one or more IR objects present in the previous version of the computer program. Once the one or more attributes associated with each IR object present in the previous version is extracted, the IRMS 106 is configured to create a data structure for storing the one or more IR objects. It should be noted that each IR object is stored in the created data structure based on the one or more attributes that are extracted for respective IR object.

Thereafter, the IRMS 106 compares the current version and the previous version of the computer program to determine one or more lines (also referred as unchanged lines) that are unchanged between the current version and the previous version of the computer program. The unchanged lines are then used by the IRMS 106 to create a line number map that includes a line number-based mapping between each unchanged line in the current version and the respective unchanged line in the previous version of the computer program.

Further, the IRMS 106 uses the created data structure and the line number map to create ID-based IR mapping between ID of each unchanged IR object of the one or more unchanged IR objects present in each unchanged line in the current version and ID of each IR object stored in the data structure.

In an embodiment, the created ID-based IR mapping between IDs of the current version and the previous version is used by the IRMS 106 for retrieving analysis information of the unchanged IR objects. The retrieved analysis information is then reused by the IRMS 106 in performing incremental analysis of the current version of the computer program. In another embodiment, the IRMS 106 may share the created ID-based IR mapping between IDs of the current version and the previous version with the electronic device 102 and the electronic device 102 may use the mapping for performing incremental analysis of the computer program.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
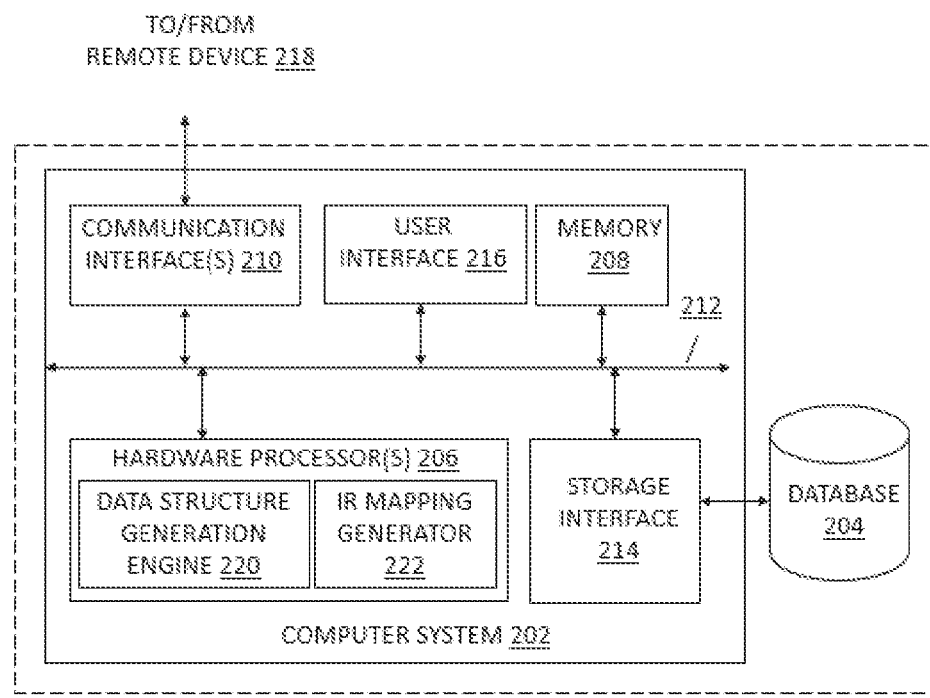
FIG. 2 illustrates an exemplary block diagram of a system for mapping intermediate representation (IR) objects for facilitating incremental analysis, in accordance with an embodiment of the present disclosure.

FIG. 2 illustrates an exemplary block diagram of an intermediate representation mapping system (IRMS) 200 for mapping intermediate representation (IR) objects for facilitating incremental analysis, in accordance with an embodiment of the present disclosure. In an embodiment, the intermediate representation mapping system (IRMS) may also be referred as system and may be interchangeably used herein. The system 200 is similar to the IRMS 106 explained with reference to FIG. 1. In some embodiments, the system 200 is embodied as a cloud-based and/or SaaS-based (software as a service) architecture. In some embodiments, the system 200 may be implemented in a server system. In some embodiments, the system 200 may be implemented in a variety of computing systems, such as laptop computers, notebooks, hand-held devices, workstations, mainframe computers, and the like.

The IRMS 200 includes a computer system 202 and a database 204. The computer system 202 includes one or more processors 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the one or more processors 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the one or more processors 206 with access to the database 204.

In one embodiment, the database 204 is configured to store a current version and a previous version of a computer program, and an intermediate representation (IR) associated with each of the current version and the previous version of the computer program. The database 204 is also configured to store analysis information associated with each IR object present in the previous version and the current version of the computer program. In at least one example embodiment, the database 204 is also configured to store a data structure created for storing one or more IR objects present in the previous version of the computer program, a line number map, and ID-based IR mappings created between IDs of the unchanged IR objects present in consecutive versions i.e., the current version and the previous version of the computer program.

The one or more processors 206 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 208.

The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the IRMS 200, as described herein. In another embodiment, the memory 208 may be realized in the form of a database server or a cloud storage working in conjunction with the IRMS 200, without departing from the scope of the present disclosure.

The one or more processors 206 are operatively coupled to the communication interface 210 such that the one or more processors 206 are capable of communicating with a remote device 218 such as, the electronic device 102, or communicated with any entity connected to the network 104. Further, the one or more processors 206 are operatively coupled to the user interface 216 for interacting with users who wants to perform incremental analysis of the computer program.

It is noted that the IRMS 200 as illustrated and hereinafter described is merely illustrative of an apparatus that could benefit from embodiments of the present disclosure and, therefore, should not be taken to limit the scope of the present disclosure. It is noted that the IRMS 200 may include fewer or more components than those depicted in FIG. 2.

In one embodiment, the one or more processors 206 includes a data structure generation engine 220, and an IR mapping generator 222.

The data structure generation engine 220 includes suitable logic and/or interfaces for receiving the current version and the previous version of the computer program, and IRs associated with each of the current version and the previous version of the computer program from the remote device 218. In an embodiment, the data structure generation engine 220 is configured to read cached IRs of the previous version that were cached while performing static program analysis/incremental analysis of the computer program. Once the IRs of the previous version are available, the data structure generation engine 220 is configured to extract relevant information i.e., one or more attributes associated with each IR object of the one or more IR objects present in the previous version of the computer program. The extracted relevant information of each IR object is then utilized by the data structure generation engine 220 to create a user define object (hereinafter also referred as chunked IR object) for every IR object.

In one embodiment, all chunked IR objects of the previous version, having a particular line number attribute is stored against that line number attribute by the data structure generation engine 220. Further, when stored, the chunked IR objects at a given line number attribute may appear in the same order as their corresponding IR objects i.e., the IR objects from which the one or more attributes were extracted to form chunked IR objects.

Further, the data structure generation engine 220 is configured to create a data structure for storing the one or more IR objects i.e., the ordered chunked IR objects present in the previous version of the computer program. The one or more IR objects are stored in the data structure based on the one or more attributes extracted for respective IR object. In an embodiment, the chunked IR objects arranged based on the line number attribute are stored in the data structure.

The IR mapping generator 222 is in communication with the data structure generation engine 220. The IR mapping generator 222 is first configured to determine one or more lines that are unchanged between the current version and the previous version of the computer program by performing line by line comparison of the current version and the previous version of the computer program using a data comparison tool. The unchanged lines are then used by the IR mapping generator 222 to generate a line number map that includes a line number-based mapping between each unchanged line in the current version and the respective unchanged line in the previous version of the computer program. In an embodiment, the data comparison tool is a GNU diff utility that is customized to provide a map of line numbers with same textual content between the two versions while ignoring the cosmetic changes such as addition/deletion of white spaces. In one embodiment, the line number map, when queried with a line number from the current version, is configured to return a mapped line number from the previous version if mapping exists for the queried line number.

Once the line number map is available, the IR mapping generator 222 uses the line number map to create an ID-based IR mapping between ID of each unchanged IR object of one or more unchanged IR objects present in each unchanged line in the current version and ID of each IR object stored in the data structure. In particular, the IR mapping generator 222 creates a map of IDs of IR objects from current version and ID of its mapped chunked IR object from the data structure created for previous version using the line number map. Basically, the IR mapping generator 222, for every IR object present in an unchanged line of the current version, first checks whether the line number attribute has a mapping in the line number map. Upon determining that the mapping is available, the IR mapping generator uses the name and type attributes of the IR object to determine a mapping chunked IR object present in the mapped line number in the date structure created by the data structure generation engine 220. Once the mapping chunked IR object is found, the IR mapping generator 222 accesses the ID of the matching IR object and create an ID-based IR mapping between the ID of the unchanged IR object and the ID of the matching IR object. The process of creating ID-based IR mapping is explained in detail with reference to FIG. 4.

In an embodiment, the ID-based IR mappings created by the IR mapping generator 222 are shared with the remote device 218.

Figure 3:
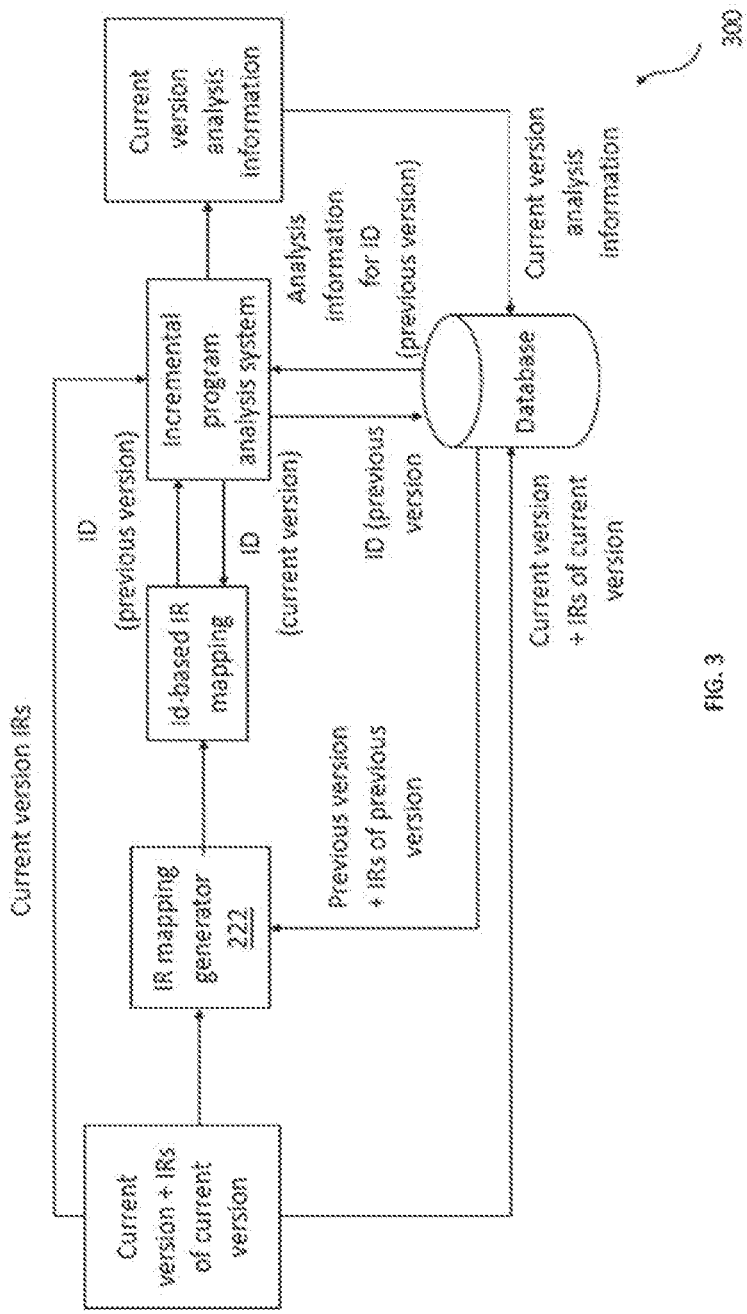
FIG. 3 illustrates a schematic block diagram representation of an IR mapping process for mapping IR objects for facilitating incremental analysis, in accordance with an embodiment of the present disclosure.

FIG. 3, with reference to FIGS. 1-2, illustrates a schematic block diagram representation 300 of an IR mapping process associated with the system 200 of FIG. 2 or the IRMS 106 of FIG. 1 for mapping IR objects for facilitating incremental analysis, in accordance with an embodiment of the present disclosure.

As seen in FIG. 3, the IR mapping generator 222 generates the mapping using the current and previous version of the computer program along with its IRs. So, when the IRs of the current version are being analyzed, for any unchanged IR object in the current version, the IRMS 200 or the incremental program analysis system present in the electronic device 102 retrieves the ID of the IR object present in the previous version using the ID-based IR mapping. Further, the IRMS 200 or the incremental program analysis system uses the retrieved ID as a key for retrieving the analysis information stored corresponding to the retrieved ID from a database, such as the database 204 or a database associated with the incremental program analysis system. The retrieved analysis information is further utilized to create analysis information of the current version that is stored in the database for future use.

FIG. 4, with reference to FIGS. 1, 2 and 3, illustrates an exemplary flow diagram of a method 400 for mapping IR objects for facilitating incremental analysis, in accordance with an embodiment of the present disclosure. The method 400 may use the system 200 of FIG. 3 and IRMS 106 of FIG. 1 for execution. In an embodiment, the system 200 comprises one or more data storage devices or the memory 208 operatively coupled to the one or more hardware processors 206 and is configured to store instructions for execution of steps of the method 400 by the one or more hardware processors 206. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 200 as depicted in FIG. 2, and the IRMS 106 of FIG. 1.

In an embodiment of the present disclosure, at step 402, the one or more hardware processors 206 of the intermediate representation mapping system (IRMS) 200 receive a current version and a previous version of a computer program, and an IR associated with each of the current version and the previous version of the computer program. The IR associated with each of the current version and the previous version includes one or more IR objects (also referred as current version IR objects and previous version IR objects).

As discussed previously, the IR is a data structure used for representing a computer program. Typically, a computer program in any programming language includes declarations, and program statements as per the syntax of the programing language. The declarations basically provide details of data being used and type of data. The data details are generally captured in a Symbol Table (ST). The program statement, expressions and its syntax are represented and stored in an Abstract Syntax Tree (AST). Further, appropriate associations are created within and across AST to ST entities. The IR associated with a version of computer program contains all the information of ST, AST and their associations that are modeled into the data structure. A language specific front end or parser populates the ST and AST information into the data structure in the form of IR objects.

At step 404 of the present disclosure, the one or more hardware processors 206 of the system 200 extract one or more attributes associated with each IR object of the one or more IR objects present in the previous version of the computer program. The one or more attributes that are extracted at this step includes a line number, an object type, an identification number (ID), and a name. The line number attribute of an IR object represents a line number of the corresponding IR object in the computer program. The object type attribute represents the type of the IR object corresponding to its program entity. The ID attribute represents a unique identification number given to the IR object and the name attribute represents textual representation of the corresponding IR object in the computer program. It should be noted that for a given line number, the ID of the IR objects appear in an order in which the AST of the statement at that line number is traversed. Hence, at any textually unchanged lines in the computer program, the IR objects (with respect to the name and object type attributes) appear in the same order. The attributes and the ordering of the IR objects is utilized by the system 200 to correctly identify matching IR objects between the current and the previous versions of the computer program.

At step 406 of the present disclosure, the one or more hardware processors 206 of the system 200 create a data structure for storing the one or more IR objects present in the previous version of the computer program. Each previous version IR object is stored in the data structure based on the one or more attributes extracted for respective previous version IR object. As discussed earlier, at this step, all chunked IR objects associated with the previous version of the computer program is stored in the data structure based on the line number attribute. An example representation of the data structure is shown with respect to FIG. 5.

At step 408 of the present disclosure, the one or more hardware processors 206 of the system 200 compare the current version and the previous version of the computer program using the data comparison tool to determine one or more lines that are unchanged between the current version and the previous version of the computer program. In an embodiment, the customized GNU diff utility is used for performing the line-by-line comparison between the current version and the previous version of the computer program. Once the one or more unchanged lines between the current version and the previous version are available, the one or more hardware processors 206 of the system 200 create a line number map (at step 410) based on the one or more unchanged lines. The line number map includes a line number-based mapping between each unchanged line in the current version and a respective unchanged line in the previous version of the computer program. An example representation of the line number map is shown with reference to FIG. 6.

In an embodiment, at step 412 of the present disclosure, the one or more hardware processors 206 of the system 200 create an ID-based IR mapping between the ID of each unchanged IR object of one or more unchanged IR objects present in each unchanged line in the current version and the ID of each IR object stored in the data structure using the created line number map. The above step 412 is better understood by way of following description.

Each unchanged line of the one or more unchanged lines includes one or more unchanged IR objects. So, when the line number map is available, the hardware processors 206 of the system 200, for each unchanged IR object that is present in each unchanged line, determine whether a line number of each unchanged IR object has a mapped line number in the line number map. For determining this, the hardware processors 206 just give the line number of the unchanged IR object to the line number map, and the line number map return the mapped line number from the previous version if exists. Upon determining that the line number of the unchanged IR object has a mapped line number, the hardware processors 206 of the system 200 access the one or more IR objects that are stored corresponding to the mapped line number from the data structure created for the previous version. For example, the line number of an unchanged IR object is '7' and the line number '7' is mapped to line number '6' in the line number map, then the hardware processors 206 accesses all the IR objects present corresponding to the line number '6' in the data structure.

Once the one or more IR objects stored corresponding to the mapped line number are available, the hardware processors 206 of the system 200 determine a matching IR object among the one or more accessed IR objects for each unchanged IR object. The matching is performed based on the name and the object type attribute of the unchanged IR object. Basically, the hardware processors 206 performs a matching of the name and the object type attribute of the unchanged IR object with the name and the object type attribute of each IR object of the one or more IR objects to obtain a matching IR object corresponding to the unchanged IR object. Thereafter, hardware processors 206 access the ID of the matching IR object based on the determination i.e., once the matching IR object is available, the ID of the matching IR object is accessed. Further, the hardware processors 206 create the ID-based IR mapping between the ID of the unchanged IR object and the ID of the matching IR object determined for the corresponding unchanged IR object. In particular, a mapping is created between the accessed ID and the ID of the unchanged IR object. An example representation of ID-based IR mapping is shown with reference to FIG. 7.

Additionally, the hardware processors 206 update a mapping attribute of the matching IR object as mapped in the data structure. In an embodiment, the updating of the mapping attribute is performed to resolve the ambiguity if any arises while matching an IR object with the set of chunked IR objects due to same name and object type attribute as more than one IR object can have the same name and the object type. It should be noted that initially the mapping attribute is set as unmapped for all IR objects present in the data structure.

Basically, when the unchanged IR object with line number attribute is matched against the set of chunked IR objects present in the mapped line number, the hardware processors 206 identify the ID of a first matching chunked IR object present in the data structure as the ID of the matching IR object. However, in some cases, the hardware processors 206 can identify the ID of the first matching chunked IR object present in the data structure as the ID of the matching IR object associated with a different unchanged IR object and this can lead to ambiguity as there can be only one to one ID-based IR mapping.

So, to resolve the ambiguity, the hardware processors 206 use the order of the appearance of IR objects as the order of the appearance of IR objects for an unchanged line remains same in both the versions. Hence, for the mapped lines, the order of the chunked IR object of the previous version will have the same sequence as that of IR objects of the current version. So, once a chunked IR object is mapped, the mapping attribute is marked as mapped in the data structure. Thus, the next time when hardware processors 206 are looking for a matching IR object, the hardware processors 206 first check whether the mapping attribute of the matching IR object is mapped or not. Upon determining that the mapping attribute of the matching IR object is not mapped, the hardware processors 206 create the ID-based IR mapping between the ID of each unchanged IR object and the ID of the matching IR object determined for a corresponding unchanged IR object.

In case the mapping attribute of the matching IR object is found to be mapped, the hardware processors 206 determine a next matching IR object among the one or more accessed IR objects for each unchanged IR object. In an embodiment, a first unmapped matching chunked IR object is considered as the next matching IR object. Thereafter, the hardware processors 206 access the ID of the next matching IR object and then create the ID-based IR mapping between the ID of each unchanged IR object and the ID of a next matching IR object determined for the corresponding unchanged IR object. Once the ID-based IR mapping is created, the hardware processors 206 update the mapping attribute of the next matching IR object as mapped in the data structure. In particular, only unmapped chunked IR objects are considered while performing matching. For example, when ID '201' of the previous version is mapped with ID '204' of the current version, the hardware processors 206 mark the ID '201' as mapped. Thereafter, when the hardware processors 206 try to match ID '206' of the current version, the hardware processors 206 does not consider the ID '201' of the previous version as it is already mapped, and thus ignores it. As a result, the hardware processors 206 identify the ID '203' (ID of the first unmapped matching chunked IR object) as mapping ID for ID '206'.

Once the ID-based IR mapping is created between ID of each unchanged IR object of one or more unchanged IR objects present in each unchanged line in the current version and ID of each IR object stored in the data structure, the hardware processor 206 use the ID-based IR mapping for performing incremental analysis of the computer program.

FIG. 5, with reference to FIGS. 1 through 4, illustrates an example representation of a data structure created for storing IR objects present in the previous version of the computer program, in accordance with an embodiment of the present disclosure.

As seen in the FIG. 5, the chunked IR objects are stored based on the line number attribute and each chunked IR object includes the line number, the ID, the object type, the name and the mapping attribute.

FIG. 6, with reference to FIGS. 1 through 5, illustrates an example representation of a line number map, in accordance with an embodiment of the present disclosure.

As seen in the FIG. 6, the line number map includes the line number-based mapping between each unchanged line i.e., line number '7' in the current version and the respective unchanged line i.e., the line number '6' in the previous version of the computer program.

FIG. 7, with reference to FIGS. 1 through 6, illustrates an example representation of an IR mapping created between IDs of the current version and the previous version of the computer program, in accordance with an embodiment of the present disclosure.

FIG. 8 is a representation of an algorithm for creating ID-based IR mapping, in accordance with an embodiment of the present disclosure.

As seen in FIG. 8, the algorithm takes the current version (currPgm) and the previous version (prevPgm) and IRs associated with the current version and the previous version (currIRs and prevIRs respectively) as an input. The algorithm then calls the procedure createLineMap( ). The procedure takes the difference between the source files currPgm and prevPgm to create a map LineMap of unchanged lines between the two versions. Thereafter, the algorithm calls the procedure buildPrevVerIRInfo( ) to build the previous version IR object information prevIRInfoMap using prevIRs. For each IR object of the previous version IRs, the procedure createIRObjChunk( ) creates a chunked IR object that is of the form (ID, Type, Name, isMapped). The isMapped is a Boolean flag which indicates the mapping status of the chunked IR object. Initially, isMapped field is set to false for all the chunked IR objects. The chunked IR object is added to a set which is indexed by line number attribute of its members in the prevIRInfoMap.

Once the prevIRInfoMap is created, the algorithm gets the mapped line number from the lineMap for the line number attribute of every IR object of current version. Whenever it finds a mapped line number i.e., mappedLine for an IR object, it queries the prevIRInfoMap using the procedure findMappedID( ). The findMappedID( ) procedure uses the name and object type attributes as the properties of IR object along with mappedLine. The algorithm then compares name and object type attributes of all chunked IR objects present at mappedLine in prevIRInfoMap with the attributes of the IR object only if the chunked IR object is not already mapped. After satisfying these conditions if the procedure finds a matching chunked IR object, it marks it as mapped and returns the ID of the matching chunked object in the previous version. After obtaining the ID of the matching chunked object, the algorithm adds it to the set IRMap.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, to perform incremental analysis of the evolving systems, the incremental analysis tools may reuse the analysis information computed earlier for IR objects that remain unchanged between versions of the program. However, with changes in the program, the IDs of the unchanged IR objects change over the versions, thus, to reuse the analysis information, the tools may require IDs of the unchanged IR objects from previous versions for retrieving analysis information of the unchanged IR objects. The techniques that are available for performing IR mapping does not guarantee correctness of the IR mapping. So, to overcome the disadvantages, embodiments of the present disclosure provide a method and a system for mapping intermediate representation (IR) objects for facilitating incremental analysis of evolving systems. More specifically, the system uses a mapping attribute along with other attributes of the IR objects for matching every unchanged IR object present in two consecutive versions, thereby ensuring accuracy of the IR mappings while removing ambiguity. Further, the system and the method use only unchanged lines in the source code to perform the mapping, thereby ensuring high efficiency.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, by an intermediate representation mapping system (IRMS) via one or more hardware processors, a current version and a previous version of a computer program, and an intermediate representation (IR) associated with each of the current version and the previous version of the computer program, wherein the IR associated with each of the current version and the previous version comprises one or more IR objects in a memory of the IRMS;
   extracting, by the IRMS via the one or more hardware processors, one or more attributes associated with each IR object of the one or more IR objects present in the previous version of the computer program, the one or more attributes comprising a line number, an object type, an identification number (ID), and a name of each IR object;
   creating and storing in a database integrated within the IRMS, by the IRMS via the one or more hardware processors, a data structure for storing the one or more IR objects present in the previous version of the computer program, wherein each IR object is stored in the data structure based on the one or more attributes extracted for a respective IR object;
   comparing, by the IRMS via the one or more hardware processors, the current version and the previous version of the computer program using a data comparison tool to determine one or more lines that are unchanged between the current version and the previous version of the computer program;
   creating and storing in the database, by the IRMS via the one or more hardware processors, a line number map based on the one or more unchanged lines, the line number map comprising a line number-based mapping between each unchanged line in the current version and a respective unchanged line in the previous version of the computer program;
   creating and storing in the database, by the IRMS via the one or more hardware processors, an ID-based IR mapping between an ID of each unchanged IR object of one or more unchanged IR objects present in each unchanged line in the current version and an ID of each IR object of the one or more IR objects present in the previous version stored in the data structure using the created line number map;
   retrieving the ID of each IR object of the one or more IR objects present in the previous version from the database using the created ID-based IR mapping; and
   performing an analysis of the current version incrementally and creating an analysis information of the current version, by reusing a previous analysis information of the one or more unchanged IR objects stored corresponding to the retrieved ID, the previous analysis information being retrieved from the database using the retrieved ID as a key for any unchanged IR object in the current version.

2. The processor implemented method of claim 1, wherein each unchanged IR object of the one or more unchanged IR objects comprises the one or more attributes.

3. The processor implemented method of claim 2, wherein the step of creating, by the IRMS via the one or more hardware processors, the ID-based IR mapping between the ID of each unchanged IR object of one or more unchanged IR objects present in each unchanged line in the current version and the ID of each IR object stored in the data structure using the created line number map comprises:
   for each unchanged IR object of the one or more unchanged IR objects, performing:
      determining, by the IRMS via the one or more hardware processors, whether a line number of each unchanged IR object has a mapped line number in the line number map;
      accessing, by the IRMS via the one or more hardware processors, the one or more IR objects that are stored corresponding to the mapped line number from the data structure based on the determination;
      determining, by the IRMS via the one or more hardware processors, a matching IR object among the one or more accessed IR objects for each unchanged IR object, wherein the matching is performed based on the name and the object type attribute of the unchanged IR object;
      accessing, by the IRMS via the one or more hardware processors, an ID of the matching IR object based on the determination;
      creating, by the IRMS via the one or more hardware processors, the ID-based IR mapping between the ID of each unchanged IR object and the ID of the matching IR object determined for a corresponding unchanged IR object; and
      updating, by the IRMS via the one or more hardware processors, a mapping attribute of the matching IR object as mapped in the data structure.

4. The processor implemented method of claim 3, wherein the step of creating, by the IRMS via the one or more hardware processors, the ID-based IR mapping between the ID of each unchanged IR object and the ID of the matching IR object comprises: checking, by the IRMS via the one or more hardware processors, whether the mapping attribute of the matching IR object is mapped or not; and upon determining that the mapping attribute of the matching IR object is not mapped, creating, by the IRMS via the one or more hardware processors, the ID-based IR mapping between the ID of each unchanged IR object and the ID of the matching IR object determined for the corresponding unchanged IR object.

5. The processor implemented method of claim 4, further comprising: upon determining that the mapping attribute of the matching IR object is mapped, determining, by the IRMS via the one or more hardware processors, a next matching IR object among the one or more accessed IR objects for each unchanged IR object; accessing, by the IRMS via the one or more hardware processors, an ID of the next matching IR object; creating, by the IRMS via the one or more hardware processors, the ID-based IR mapping between the ID of each unchanged IR object and the ID of a next matching IR object determined for the corresponding unchanged IR object; and updating, by the IRMS via the one or more hardware processors, the mapping attribute of the next matching IR object as mapped in the data structure.

6. An intermediate representation mapping system (IRMS), comprising:
a memory storing instructions;
one or more communication interfaces; and
one or more hardware processors coupled to the memory via the one or more communication interfaces, wherein the one or more hardware processors are configured by the instructions to:
receive a current version and a previous version of a computer program, and an intermediate representation (IR) associated with each of the current version and the previous version of the computer program, wherein the IR associated with each of the current version and the previous version comprises one or more IR objects loaded in the memory of the IRMS;
extract one or more attributes associated with each IR object of the one or more IR objects present in the previous version of the computer program, the one or more attributes comprising a line number, an object type, an identification number (ID), and a name of each IR object;
create and store in a database integrated within the IRMS, a data structure for storing the one or more IR objects present in the previous version of the computer program, wherein each IR object is stored in the data structure based on the one or more attributes extracted for a respective IR object;
compare the current version and the previous version of the computer program using a data comparison tool to determine one or more lines that are unchanged between the current version and the previous version of the computer program;
create and store in the database, a line number map based on the one or more unchanged lines, the line number map comprising a line number-based mapping between each unchanged line in the current version and the respective unchanged line in the previous version of the computer program;
create and store in the database, an ID-based IR mapping between an ID of each unchanged IR object of one or more unchanged IR objects present in each unchanged line in the current version and an ID of each IR object of the one or more IR objects present in the previous version stored in the data structure using the created line number map;
retrieve the ID of each IR object of the one or more IR objects present in the previous version from the database using the created ID-based IR mapping; and
perform an analysis of the current version incrementally and create an analysis information of the current version, by reusing a previous analysis information of the one or more unchanged IR objects stored corresponding to the retrieved ID, the previous analysis information being retrieved from the database using the retrieved ID as a key for any unchanged IR object in the current version.

7. The system as claimed in claim 6, wherein each unchanged IR object of the one or more unchanged IR objects comprises the one or more attributes.

8. The system as claimed in claim 7, wherein the one or more hardware processors are configured to create the ID-based IR mapping between the ID of each unchanged IR object of one or more unchanged IR objects present in each unchanged line in the current version and the ID of each IR object stored in the data structure using the created line number map by performing: for each unchanged IR object of the one or more unchanged IR objects, determining whether a line number of each unchanged IR object has a mapped line number in the line number map; accessing the one or more IR objects that are stored corresponding to the mapped line number from the data structure based on the determination; determining a matching IR object among the one or more accessed IR objects for each unchanged IR object, wherein the matching is performed based on the name and the object type attribute of the unchanged IR object; accessing an ID of the matching IR object based on the determination; creating the ID-based IR mapping between the ID of each unchanged IR object and the ID of the matching IR object determined for a corresponding unchanged IR object; and updating a mapping attribute of the matching IR object as mapped in the data structure.

9. The system as claimed in claim 8, wherein the one or more hardware processors are configured to create the ID-based IR mapping between the ID of each unchanged IR object and the ID of the matching IR object by performing: checking whether the mapping attribute of the matching IR object is mapped or not; and upon determining that the mapping attribute of the matching IR object is not mapped, creating the ID-based IR mapping between the ID of each unchanged IR object and the ID of the matching IR object determined for the corresponding unchanged IR object.

10. The system as claimed in claim 9, wherein the one or more hardware processors are configured to: upon determining that the mapping attribute of the matching IR object is mapped, determine a next matching IR object among the one or more accessed IR objects for each unchanged IR object; access an ID of the next matching IR object; create the ID-based IR mapping between the ID of each unchanged IR object and the ID of a next matching IR object determined for the corresponding unchanged IR object; and update the mapping attribute of the next matching IR object as mapped in the data structure.

11. One or more non-transitory computer-readable storage mediums comprising one or more instructions which when executed by one or more hardware processors cause:
receiving, by an intermediate representation mapping system (IRMS), a current version and a previous version of a computer program, and an intermediate representation (IR) associated with each of the current version and the previous version of the computer program, wherein the IR associated with each of the current version and the previous version comprises one or more IR objects in a memory of the IRMS;

extracting, by the IRMS, one or more attributes associated with each IR object of the one or more IR objects present in the previous version of the computer program, the one or more attributes comprising a line number, an object type, an identification number (ID), and a name of each IR object;

creating and storing in a database integrated within the IRMS, by the IRMS, a data structure for storing the one or more IR objects present in the previous version of the computer program, wherein each IR object is stored in the data structure based on the one or more attributes extracted for a respective IR object;

comparing, by the IRMS, the current version and the previous version of the computer program using a data comparison tool to determine one or more lines that are unchanged between the current version and the previous version of the computer program;

creating and storing in the database, by the IRMS, a line number map based on the one or more unchanged lines, the line number map comprising a line number-based mapping between each unchanged line in the current version and a respective unchanged line in the previous version of the computer program; and creating and storing in the database, by the IRMS, an ID-based IR mapping between an ID of each unchanged IR object of one or more unchanged IR objects present in each unchanged line in the current version and an ID of each IR object of the one or more IR objects present in the previous version stored in the data structure using the created line number map;

retrieving the ID of each IR object of the one or more IR objects present in the previous version from the database using the created ID-based IR mapping; and performing an analysis of the current version incrementally and creating an analysis information of the current version, by reusing a previous analysis information of the one or more unchanged IR objects stored corresponding to the retrieved ID, the previous analysis information being retrieved from the database using the retrieved ID as a key for any unchanged IR object in the current version.

12. The one or more non-transitory computer-readable storage mediums of claim 11, wherein each unchanged IR object of the one or more unchanged IR objects comprises the one or more attributes.

13. The one or more non-transitory computer-readable storage mediums of claim 12, wherein the step of creating, by the IRMS, the ID-based IR mapping between the ID of each unchanged IR object of one or more unchanged IR objects present in each unchanged line in the current version and the ID of each IR object stored in the data structure using the created line number map comprises: for each unchanged IR object of the one or more unchanged IR objects, performing: determining, by the IRMS, whether a line number of each unchanged IR object has a mapped line number in the line number map; accessing, by the IRMS, the one or more IR objects that are stored corresponding to the mapped line number from the data structure based on the determination; determining, by the IRMS, a matching IR object among the one or more accessed IR objects for each unchanged IR object, wherein the matching is performed based on the name and the object type attribute of the unchanged IR object; accessing, by the IRMS, an ID of the matching IR object based on the determination; creating, by the IRMS, the ID-based IR mapping between the ID of each unchanged IR object and the ID of the matching IR object determined for a corresponding unchanged IR object; and updating, by the IRMS, a mapping attribute of the matching IR object as mapped in the data structure.

14. The one or more non-transitory computer-readable storage mediums of claim 13, wherein the step of creating, by the IRMS, the ID-based IR mapping between the ID of each unchanged IR object and the ID of the matching IR object comprises: checking, by the IRMS, whether the mapping attribute of the matching IR object is mapped or not; and upon determining that the mapping attribute of the matching IR object is not mapped, creating, by the IRMS, the ID-based IR mapping between the ID of each unchanged IR object and the ID of the matching IR object determined for the corresponding unchanged IR object.

15. The one or more non-transitory computer-readable storage mediums of claim 14, wherein the one or more instructions which when executed by the one or more hardware processors further cause: upon determining that the mapping attribute of the matching IR object is mapped, determining, by the IRMS, a next matching IR object among the one or more accessed IR objects for each unchanged IR object; accessing, by the IRMS, an ID of the next matching IR object; creating, by the IRMS, the ID-based IR mapping between the ID of each unchanged IR object and the ID of a next matching IR object determined for the corresponding unchanged IR object; and updating, by the IRMS, the mapping attribute of the next matching IR object as mapped in the data structure.

* * * * *